Figure 21:
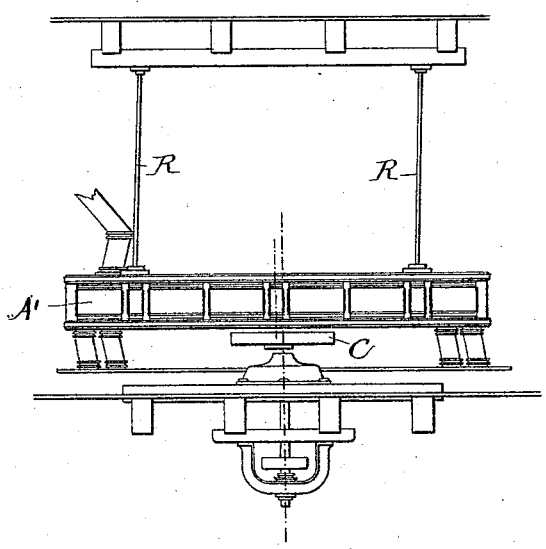

(No Model.) 2 Sheets—Sheet 1.
H. BITTINGER.
CHANNEL FOR CONVEYING GRANULATED OR PULVERULENT SUBSTANCES
No. 538,860. Patented May 7, 1895.
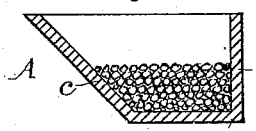
Fig. 1.
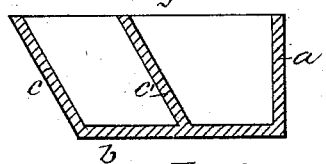
Fig. 2.
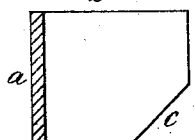
Fig. 3.
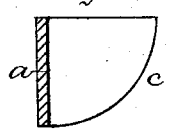
Fig. 4.
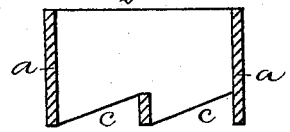
Fig. 5.
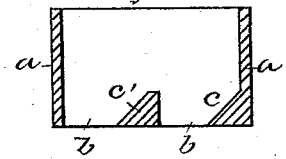
Fig. 5a.
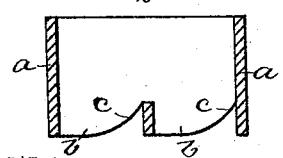
Fig. 6.
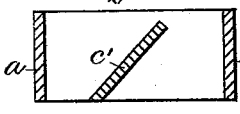
Fig. 7.
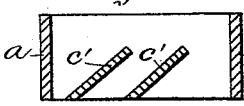
Fig. 9.
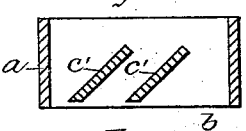
Fig. 10.
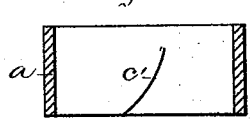
Fig. 11.
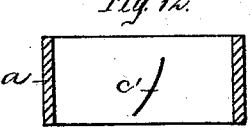
Fig. 12.
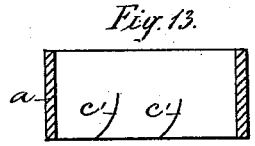
Fig. 13.
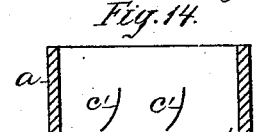
Fig. 14.
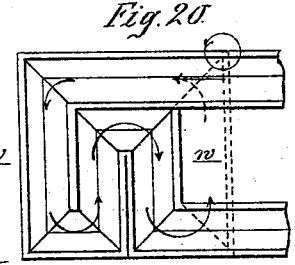
Fig. 20.
Fig. 20a.
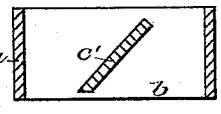
Fig. 8.
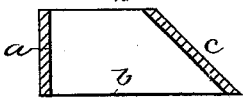
Fig. 15.
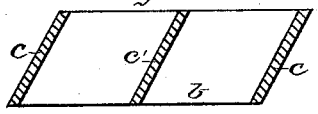
Fig. 16.
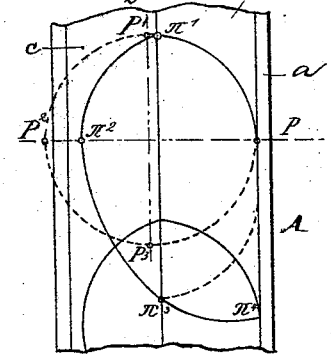
Fig. 17.
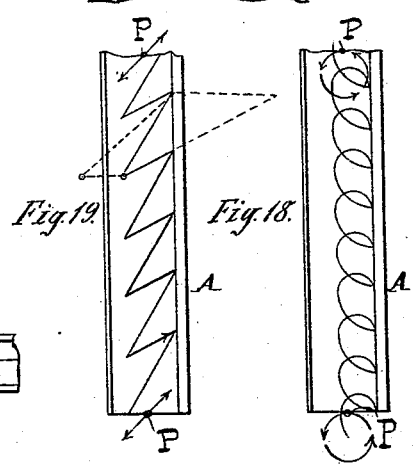
Fig. 19. Fig. 18.
Witnesses:
Inventor:
Hans Bittinger,
by ........
Attorney.

(No Model.) 2 Sheets—Sheet 2.

H. BITTINGER.
CHANNEL FOR CONVEYING GRANULATED OR PULVERULENT SUBSTANCES.

No. 538,860. Patented May 7, 1895.

Witnesses:
Klas H. Ternstedt
Chas. W. Thomas

Inventor:
Hans Bittinger,
by A. Faberduhauf
Attorney.

THE NORRIS PETERS CO., PHOTO-LITHO., WASHINGTON, D. C.

United States Patent Office.

HANS BITTINGER, OF DARMSTADT, GERMANY.

CHANNEL FOR CONVEYING GRANULATED OR PULVERULENT SUBSTANCES.

SPECIFICATION forming part of Letters Patent No. 538,860, dated May 7, 1895.

Application filed February 28, 1894. Serial No. 501,786. (No model.) Patented in Germany February 15, 1889, No. 49,378, February 1, 1890, No. 55,744, and October 5, 1890, No. 59,378; in France February 18, 1890, No. 203,833; in England February 18, 1890, No. 2,622; in Belgium February 18, 1890, No. 89,555; in Italy March 31, 1890, XXIV, 27,011, and LIII, 140, and in Austria-Hungary May 5, 1890, No. 4,827 and No. 19,908, and June 20, 1890, No. 11,368 and No. 27,820.

*To all whom it may concern:*

Be it known that I, HANS BITTINGER, a subject of the King of Bavaria, residing at Darmstadt, in the Grand Duchy of Hesse, Germany, have invented new and useful Improvements in Channels for Conveying Reduced or Granular or Pulverulent Substances, (for which I have obtained Letters Patent in Austria-Hungary, No. 4,827 and No. 19,908, dated May 5, 1890, and No. 11,368 and No. 27,820, dated June 20, 1890; in Germany, No. 49,378, dated February 15, 1889, and No. 55,744, dated February 1, 1890, and No. 59,378, dated October 5, 1890; in Italy, XXIV, 27,011, and LIII, 140, dated March 31, 1890; in France, No. 203,833, dated February 18, 1890; in Belgium, No. 89,555, dated February 18, 1890, and in England, No. 2,622, dated February 18, 1890,) of which the following is a specification.

My invention has reference to means for conveying reduced or pulverulent material, which may also be embodied in sifting or bolting machines.

It consists essentially in a conveyer for reduced or pulverulent material composed of a conduit having a substantially horizontal bottom and a rigid wall forming an angle with the bottom, combined with means for imparting to said conduit a horizontal curvilinear or oblique shaking motion. For the purpose of sifting material the bottom of the conduit may be a sieve.

The nature of my said invention will best be understood when described in connection with the annexed drawings, in which—

Figure 22:
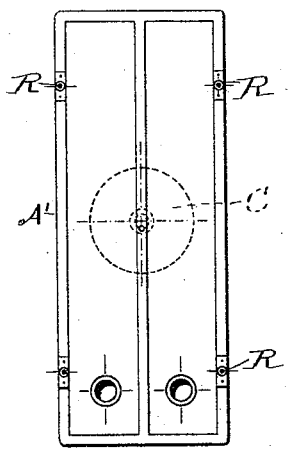
Figure 23:
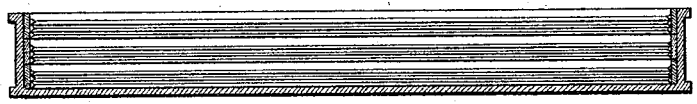
Figure 24:
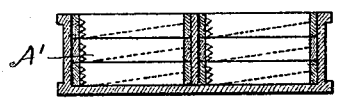

Figures 1 to 16 are vertical cross-sections illustrating different forms for the conduit or trough. Fig. 17 is a plan view of a portion of the trough shown in Fig. 1 and illustrating the conveyance of the material. Figs. 18, 19, and 20 are plan views, on a smaller scale, illustrating the conveyance of the material. Fig. 20$^a$ is a longitudinal section of Fig. 20. Fig. 21 is a side elevation of a sifting-machine, of which the conduits form parts. Figs. 22 to 24 are detail views thereof.

Similar letters of reference designate corresponding parts.

Referring now to Fig. 1 of the drawings the letter A designates a trough having a substantially horizontal bottom $b$, a side wall $a$ at substantially right angles thereto and a wall $c$ placed at an inclination to said bottom. The action of this inclined side $c$, when a usual circular motion in a horizontal plane, or an oblique shaking motion is imparted to the conduit, is to cause the advance of the reduced or pulverulent material within said conduit. This action I have illustrated in Fig. 17, where P designates a particle of the material. If both sides of the trough were at right angles to the bottom, the path of the particle P would lie in the circle P P' P$^2$ P$^3$ P, provided a curvilinear motion in a horizontal plane were imparted to the conduit. When, however, the wall $c$ is inclined the path of the particle P will lie in the curve P $\pi'$ $\pi^2$ $\pi^3$ $\pi^4$ so that the particle is advanced at each complete vibration the distance P $\pi^4$. The inclined wall $c$ retards the motion of the particle P, so that its path lies in the arc $\pi'$ $\pi^2$ on the ascent of the particle, but, owing to the accelerated downward motion, the path of the particle lies in the arc $\pi^2$ $\pi^3$ on its descent. At the end of the arc $\pi^3$ $\pi^4$ the particle impinges upon the vertical wall of the conduit and starts anew.

When an oblique shaking motion is imparted to the conduit the action is quite similar, but the particle moves in a zig zag path as shown in Fig. 19.

Of course, it is to be understood that the conduit or any of its parts may be made of wood, metal or other suitable material and that the construction of the same may be modified in many ways without losing the properties above pointed out. I will now proceed to describe a number of these modifications.

In Figs. 2, 5$^a$, 7 and 8 I have shown two channels formed side by side by an intermediate inclined partition or wall $c'$.

In Fig. 8 I have shown the partition or wall $c'$ terminating at its bottom above the bottom of the conduit. This construction is adopted when it is necessary that the bottom of the conduit should always be covered to a certain depth with the material, as for example, in sifting machines, where it is necessary that part of the material shall not participate in the motion of the other part. In the present instance this latter part will move in a circular path.

In place of the inclined walls, curved walls, such as shown in Figs. 4 and 6 or curved partitions as shown in Figs. 11 to 14, may be used. In Figs. 1ª, 4, 5 and 6 the bottoms and walls are made continuous and in one piece. In Fig. 16 both the outside walls and the partition are inclined.

By the term inclined as applied to the walls or partitions it must be understood that the inclination may be effected by setting flat walls or partitions at an angle to the bottom or by curving the same, or by curving or bending the bottom upwardly.

In Figs. 21 and 22 I have shown the conduits forming the sieves A' of a sifting machine. As usual, they are suspended by the use of suitable rods R, and a horizontal curvilinear motion is imparted to the same from below by a crank C.

The construction of such machines is well known and need not be further described here.

What I claim as new is—

1. A conveyer for reduced or pulverulent material consisting of a conduit having a substantially horizontal bottom and a rigid wall forming an angle with the same, and means for shaking the conduit in a horizontal plane, substantially as and for the purpose specified.

2. A conveyer for reduced or pulverulent material consisting of a conduit having a substantially horizontal bottom, side walls, and an intermediate longitudinal inclined partition, and means for shaking the conduit in a horizontal plane, substantially as and for the purpose specified.

3. A conveyer for reduced or pulverulent material consisting of a conduit having a substantially horizontal bottom, side walls, and an intermediate longitudinal inclined partition terminating above the bottom of the conduit, and means for shaking the conduit in a horizontal plane, substantially as and for the purpose specified.

4. A conveyer for reduced or pulverulent material consisting of a conduit having a substantially horizontal sieve constituting its bottom and a rigid wall forming an angle with the same, and means for shaking the conduit in a horizontal plane, substantially as and for the purpose specified.

In testimony whereof I have signed my name to this specification in the presence of two subscribing witnesses.

HANS BITTINGER.

Witnesses:
BERNHARD SCHMUK,
CARL ED. HALEN.